United States Patent
Kelch et al.

(10) Patent No.: US 8,124,691 B2
(45) Date of Patent: Feb. 28, 2012

(54) SHAPE MEMORY POLYMER WITH POLYESTER AND POLYACRYLATE SEGMENTS AND PROCESS FOR ITS PRODUCTION AND PROGRAMMING

(75) Inventors: Steffen Kelch, Oberengstringen (CH); Andreas Lendlein, Berlin (DE); Ingo Bellin, Mannheim (DE)

(73) Assignee: GKSS Forschungszentrum Geesthacht GmbH, Geesthacht (DE)

( * ) Notice: Subject to any disclaimer, the term of this patent is extended or adjusted under 35 U.S.C. 154(b) by 588 days.

(21) Appl. No.: 12/248,905

(22) Filed: Oct. 10, 2008

(65) Prior Publication Data
US 2009/0076223 A1 Mar. 19, 2009

Related U.S. Application Data

(63) Continuation of application No. PCT/EP2007/052859, filed on Mar. 26, 2007.

(30) Foreign Application Priority Data

Apr. 12, 2006 (DE) .......................... 10 2006 017 759

(51) Int. Cl.
*C08L 53/00* (2006.01)
(52) U.S. Cl. ...................... 525/186; 525/185; 525/190
(58) Field of Classification Search .................. 525/185, 525/186, 190
See application file for complete search history.

(56) References Cited

U.S. PATENT DOCUMENTS
6,160,084 A 12/2000 Langer et al.
(Continued)

FOREIGN PATENT DOCUMENTS
DE 10208211 A1 9/2003
(Continued)

OTHER PUBLICATIONS
Lendlein et al. Angew. Chem. Int. Ed. 2002, 41, 2034-2057.*
(Continued)

*Primary Examiner* — David W Wu
*Assistant Examiner* — Vu A Nguyen
(74) *Attorney, Agent, or Firm* — Perkins Coie LLP; Aaron Wininger

(57) ABSTRACT

The invention relates to a shape memory polymer, to a process for its production and to a process for its programming. The inventive shape memory polymer has at least two switching segments with different transition temperatures ($T_{trans,1}$, $T_{trans,2}$) such that the polymer, depending on the temperature, as well as a permanent shape (PF), can also assume at least two temporary shapes (TF1, TF2). The first switching segment is based essentially on a polyester of the general formula (I) where n=1 ... 6 or a copolyester of the general formula (I) with different n or a derivative thereof. The second switching segment is based essentially on a polyacrylate of the general formula (II) in which R is H or $CH_3$, and $R_1$ is a saturated or unsaturated, cyclic or aliphatic, unsubstituted or substituted C1-C10 radical.

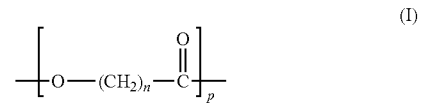

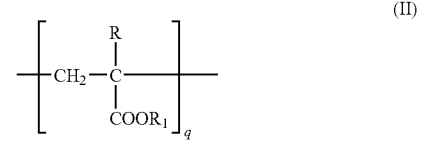

12 Claims, 3 Drawing Sheets

U.S. PATENT DOCUMENTS

| | | | |
|---|---|---|---|
| 7,037,984 | B2 | 5/2006 | Lendlein et al. |
| 7,217,744 | B2 | 5/2007 | Lendlein et al. |
| 2003/0191276 | A1 | 10/2003 | Lendlein et al. |
| 2004/0024143 | A1 | 2/2004 | Lendlein et al. |
| 2005/0119733 | A1 | 6/2005 | Wiliams et al. |
| 2006/0033362 | A1 | 2/2006 | Barvosa-Carter et al. |

FOREIGN PATENT DOCUMENTS

| | | |
|---|---|---|
| EP | 1338613 A1 | 8/2003 |
| EP | 1362879 A2 | 11/2003 |
| WO | WO9942147 A1 | 8/1999 |
| WO | 0191822 A1 | 12/2001 |
| WO | 2004033539 A1 | 4/2004 |
| WO | 2005028534 A1 | 3/2005 |

OTHER PUBLICATIONS

Bellin et al. PNAS, 2006, 103(48), 18043-18047.*

Liu G., Ding X., Cao Y., Zheng Z., Peng Y.: "Novel shape-memory polymer with two transition temperatures" Macromolecular Rapid Communications, vol. 26, 2005, pp. 649-652.

Jia Z. Zhou Y., Yan D.:"Amphiphilic Star-block Copolymers based on a Hyperbranched Core: Synthesis and Supramolecular Self-Assemblys" Journal of Polymer Science: Part A; Polymer Chemistry, vol. 43, 2005, pp. 6534-6544, XP002437005.

Jakubowski W., Matyjaszewski K.: "Activator generated by electron transfer for atom transfer radical polymerization" Macromolecules, vol. 38, 2005, pp. 4139-4146, XP002437006.

Lenoir S., Riva R., Lou X., Detrembleur CH., Jerome R., Lecomte PH.: "Ring-Opening Polymerization of alpha-caprolactone and chemical modification of poly(alpha-chloro-e-caprolactone) by atom transfer radical processes" Macromolecules, vol. 37, 2004, pp. 4055-4061, XP002437007.

Degirmenci M., Hizal G., Yagci Y.: "Synthesis and characterization of macrophotoinitiators of poly (e-caprolactone) and their use in block copolymerization" Macromolecules, vol. 35, 2002, pp. 8265-8270, xp002437008.

Annette M Schmidt: "Bioabbaubare Polymernetzwerk-Systeme mit Formgedächtniseffekt and kristallisierbarem Schaltsegment" Dissertation, Jun. 6, 2002, pp. 1-134, XP002437009 Aachen.

Naohisa T., Kazuhiro B., Shinya T., Tomoyuki K., "Synthesis of poly(methylacrylate-b-epsilon-caprolactone) and application to compatibilizer for poly (l-lactide)/poly (epsilon-caprolactone)blend system" Materials Transactions, vol. 46, 12, 2005, pp. 2668-2672, xp009084882.

Furch M et al.:"Synthesis and caracterisation of copolymers of methylacrylate and poly(glycolide) macromonomers" Polymer, Elsevier Swcience Publishers B.V, GB, vol. 39, 10, May 1998, pp. 1977-1982, xp004108245 ISSN:0032-3861.

Eguiburu J L et al.: "Blends of amorphous and crystalline polylactides with poly (methyl methacrylate) and poly (methyl acrylate): a miscibility study" Polymer, Elsevier Science Publishers B.V, GB vol. 39, 26, Dec. 1998, pp. 6891-6897, xp004138379 ISSN: 0032-3861.

Johnson R M et al.: "Iron Tris (Bipyridine)-Centered Star Block Copolymers: Chelation of Triblock Macroligands Generated by ROP and ATRP" Macromolecules, ACS, Washington DC, US, vol. 37, 8, Apr. 20, 2004, pp. 2718-2727, xp001196167 ISSN: 0024-9297.

A. Lendlein, A.M. Schmidt, R. Langer: Proc, Natl. Acad. Sci USA, 2001,98, 842-847.

A. Lendlein, S.Kelch: Angew. Chem. 2002, 114, 2138-2162.

* cited by examiner

SHAPE MEMORY POLYMER WITH POLYESTER AND POLYACRYLATE SEGMENTS AND PROCESS FOR ITS PRODUCTION AND PROGRAMMING

CROSS REFERENCE TO RELATED APPLICATIONS

This application is a continuation of PCT/EP2007/052859 filed Mar. 26, 2007, which claims priority to DE 10 2006 017 759.2 filed Apr. 12, 2006, both of which are incorporated by reference herein.

FIELD OF THE INVENTION

The invention relates to a shape memory polymer capable of storing at least two temporary shapes, in addition to one permanent shape, a method of manufacturing same and a method of shape programming of same.

BACKGROUND

So-called shape memory polymers or SMPs, which undergo a change in shape from a temporary shape into a permanent shape corresponding to a previous programming on induction by a suitable stimulus, are known in the prior art. This shape memory effect is most often stimulated thermally, i.e., the restoring effect driven by entropy elasticity occurs on heating the polymer material to a temperature above the defined transition temperature. Shape memory polymers are usually polymer networks in which chemical (covalent) crosslinking sites or physical (noncovalent) crosslinking sites determine the permanent shape. The programming takes place by deforming the polymer material to a temperature above the transition temperature of a "switching segment" and then cooling the polymer to a temperature below this temperature while maintaining the deformation forces to imprint the temporary shape. Renewed heating to a temperature above the transition temperature leads to a phase transition and restoration of the original permanent shape.

In addition, polymer networks having two switching segments with different transition temperatures have also recently become known.

For example, EP 1 362 879 A describes shape memory polymers (interpenetrating networks IPNs in this case) comprising a covalently crosslinked polymer component, in particular based on caprolactone, lactide, glycolide or p-dioxanone units, and a noncovalently crosslinked polyester urethane component. The polymer is able to store two temporary shapes, for which transition temperatures of 50° C. and 90° C. have been reported.

Liu et al. (*Macrmol. Rap. Comm.* 26, 2005, 649ff) describes an SMP (semi-interpenetrating network SIPN) comprising polymethyl methacrylate units (PMMA) and polyethylene glycol units (PEG) and also having two transition temperatures (at 40° C. and 86° C.). However, the programming method described there allows only a temporary shape to be stored.

One disadvantage of the known shape memory polymers for many applications is that their switching temperatures are relatively close together, which thus requires accurate setting of the temperature when heating between two transition temperatures. Furthermore, the relatively low transition temperatures may be problematical for certain applications, namely if high application-related temperatures occur without restoration of the permanent shape being desired.

SUMMARY

Embodiments of the invention provide a novel biocompatible shape memory polymer that is capable of storing at least two temporary shapes. The corresponding switching temperatures of the polymers should be a great distance apart in particular and at least one of the transition temperatures should be at a relatively high temperature level. In addition, a method for programming at least two temporary shapes of the shape memory polymer is to be made available.

The inventive shape memory polymer has at least two switching segments with different transition temperatures, so that the polymer material may assume at least two temporary shapes in addition to a permanent shape, depending on the temperature. The inventive polymer system comprises a first switching segment, which is based essentially on a polyester of general formula I, in which n=1 . . . 6 or a derivative thereof, or based on a copolyester of general formula I, in which n=1 . . . 6, in which at least two ester units of different chain lengths n are present, or a derivative thereof.

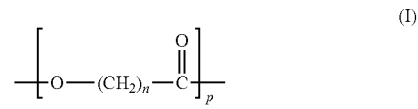

The polymer system also comprises a second switching segment based essentially on a polyacrylate of general formula II, in which R is H or $CH_3$ and $R_1$ denotes a saturated or unsaturated, cyclic or aliphatic, substituted or unsubstituted C1-C10 radical.

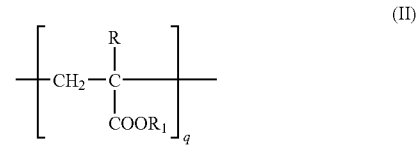

The term "switching segment" is understood to refer to an oligomer or polymer according to the stated formulas I and/or II having a chain length p and/or q, which allows the development of a separate phase through phase separation in the solid state and thus allows a basis for developing the typical material properties of the corresponding compound. This achieves the result that the polymer system as a whole has material properties which may be assigned to the respective switching segments, in particular two or more different switching temperatures for the thermally induced effect, which may be glass transition temperatures or melt temperatures, independently of one another. From a structural standpoint, the switching segments may be covalently or noncovalently crosslinked and may be linked together, in terminal position, at one or both ends and/or to a polymer backbone. In addition, within the scope of the present invention, derivatives of the polyester according to formula I include structures in which one or more of the hydrogen radicals of the methylene units ($—CH_2—$) are replaced by branched or unbranched, saturated or unsaturated C1 to C6 radicals. A deciding factor in the choice of substituents within the stated range is that the development of a separate phase of the switching segments is not prevented.

Through the composition according to the invention, a material is made available which, after appropriate programming, is capable of imposing at least two deformations at the same time, these shapes being restored by appropriate thermal stimuli after activation. Switching temperatures having a large temperature interval between them have proven to be especially suitable for the inventive polymer system. In particular, the two switching temperatures of the switching segments according to formulas I and II differ from one another by at least 40K, in particular at least 50K and preferably at least 60K. Another advantage of the inventive material is the high switching temperature of the poly(meth)acrylate segment, which is at least 110° C., in particular at least 120° C., depending on the radical $R_1$ and the average chain length q. Another advantage is that the two polymer segments are physiologically absorbable and their degradation products are physiologically compatible.

In a preferred embodiment of the invention, the first switching segment comprises a poly(c-caprolactone) segment with n=5 or a derivative thereof in which the aliphatic carbons independently of one another may be substituted with one or two branched or unbranched, saturated or unsaturated C1 to C6 radicals. However, nonderivatized poly(ε-caprolactone) with n=5 according to formula I, i.e., without substituents, is especially preferred.

In another advantageous embodiment of the invention, the second switching segment comprises a polycyclohexyl methacrylate segment with R=$CH_3$ and $R_1$=$C_6H_{11}$ (cyclohexyl) or a polycyclohexyl acrylate segment with R=H and $R_1$=$C_6H_{11}$ according to formula II. Of these, polycyclohexyl methacrylate is especially preferred. Other advantageous switching segments that fall under formula II include polymethyl methacrylate (PMMA) and poly(2-hydroxyethyl methacrylate) (PHEMA).

The molecular weights of the segments as well as their amounts by weight in the polymer and their relative weight ratios (first switching segment/second switching segment) are coordinated, so that criteria described above for the switching temperatures are met and definite shape changes are achieved with the at least two switching transitions. The first switching segment (polyester) advantageously has an average molecular weight in the range of 2000 g/mol to 100,000 g/mol, in particular from 5,000 g/mol to 40,000 g/mol, preferably of approx. 10,000 g/mol. A weight amount of the polyester segment in the shape memory in the range of 25% to 75%, in particular in the range of 30% to 70%, preferably in the range of 50% to 60% is preferred. Accordingly, the polyacrylate segment has a weight amount in the range of 75% to 25%, in particular in the range of 70% to 30%, preferably 50% to 40%.

The inventive polymer system may be a polymer network in which the polymer chains having switching segments are crosslinked with one another or may form an interpenetrating network (IPN) or a semi-interpenetrating network (SIPN). It is preferably present in the form of an AB polymer network in which one of the switching segments may be crosslinked by the other switching segment, which is bound at both ends. In particular, the shape memory polymer comprises polyacrylate segments crosslinked by polyester chains. The latter are covalently bonded to the polyacrylate segments at their two ends. However, the inverse constellation in which the polyacrylate segments crosslink the polyester segments at both ends is also conceivable.

The inventive shape memory polymer may advantageously be produced by a method, which includes copolymerizing
  a polyester macromonomer of general formula I a, in which n=1 . . . 6, and Y is any connecting radical or a copolyester of the general formula I a (in which n and Y have the meanings given above) with at least two ester units with different values of n or a derivative thereof and

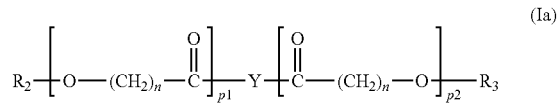

an acrylate monomer of general formula II a, in which R is H or $CH_3$ and $R_1$ is a saturated or unsaturated, cyclic or aliphatic, substituted or unsubstituted C1-C10 radical:

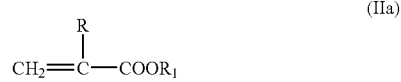

Preferred embodiments of the polyester and the acrylate monomer are selected according to the preceding description, where p1 and p2 in formula I a, i.e., the chain lengths of the polyester and/or copolymers may be the same or different. The radical Y serves exclusively to connect the two polyester units with a reversal of the chain direction, so that polymerizable terminal groups which are used for crosslinking may be attached at both ends (see below).

A suitable macromonomer of the polyester component corresponds to general formula I b, for example, in which r=2, . . . , 8 and X=O or NH. A component with r=2, p3=2 and X=O is especially preferred, i.e., the polyester macromonomer is obtained by polymerization of diethylene glycol HO—$CH_2$—$CH_2$—O—$CH_2$—$CH_2$—OH with the corresponding ester monomers.

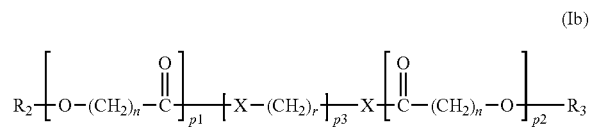

The first terminal group $R_2$ and/or the second terminal group $R_3$ of the first switching segment, independently of one another, is/are preferably a polymerizable radical. $R_2$ and $R_3$ are both preferably a polymerizable radical. Acryl or methacryl radicals are especially preferably used for $R_2$ and/or $R_3$; each may be a methacryl radical in particular. In this way, a network in which the polyester segments are linked at both ends is obtained when these two components are copolymerized.

According to an especially preferred embodiment, cyclohexyl methacrylate according to formula II b is used as the acrylate component, leading to polycyclohexyl methacrylate segments according to formula II c in their (homo)polymerization.

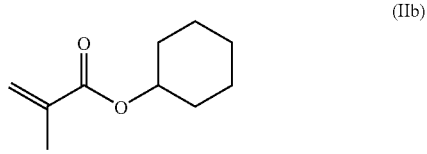

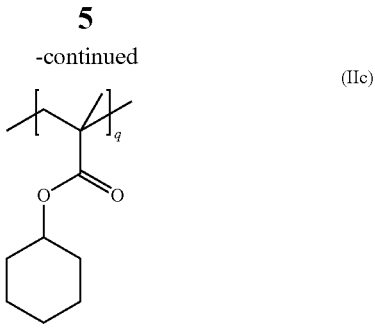

(IIc)

In an especially preferred embodiment, the macromonomer poly(ε-caprolactone) dimethacrylate (PCLDMA) according to formula I c is thus copolymerized with the monomer cyclohexyl methacrylate (CHMA) according to formula II b. This yields a crosslinked AB block copolymer having segments according to formula I c and segments according to formula II c.

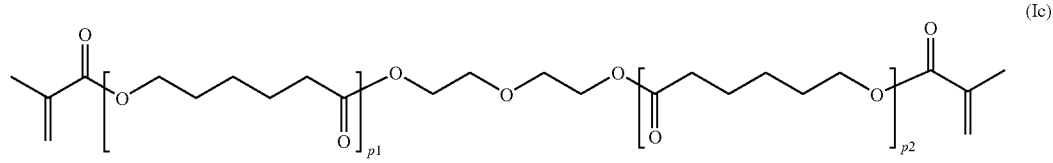

(Ic)

Another important aspect of the present invention relates to a method for programming at least two temporary shapes in a shape memory polymer according to the invention. The inventive method comprises the following steps:
(a) converting the shape memory polymer into a shape corresponding to the first temporary shape at a temperature above the first transition temperature,
(b) cooling to a temperature below the upper transition temperature, imposing the first temporary shape,
(c) converting the shape memory polymer into a shape corresponding to the second temporary shape at a temperature above the lower transition temperature and below the upper transition temperature, and
(d) cooling to a temperature below the lower transition temperature, imposing the second temporary shape.

The cooling that takes place in step (b) may optionally be to an intermediate temperature below the upper transition temperature and above the lower transition temperature or to a temperature below the lower transition temperature. The deciding factor for imposing the first temporary shape is that the polymer is cooled to a temperature below the upper transition temperature. If the shape memory polymer is one capable of storing more than two temporary shapes, i.e., it has at least three switching segments, then the other temporary shapes are programmed similarly by exerting a deformation force above the corresponding transition temperature and imposing the temporary shape by cooling below this transition temperature while retaining the deformation force.

The inventive shape memory polymer is especially advantageously suitable for applications in construction technology, e.g., as fastening elements, which can be converted to an anchoring shape after exerting a corresponding temperature stimulus. In particular, the inventive polymer is advantageous in areas in which relatively high temperatures occur due to the process, but restoration of the permanent shape of the polymer is not desired.

BRIEF DESCRIPTION OF THE DRAWINGS

The invention will be explained in greater detail below in exemplary embodiments on the basis of the respective drawings, in which.

DETAILED DESCRIPTION

Figure 1:
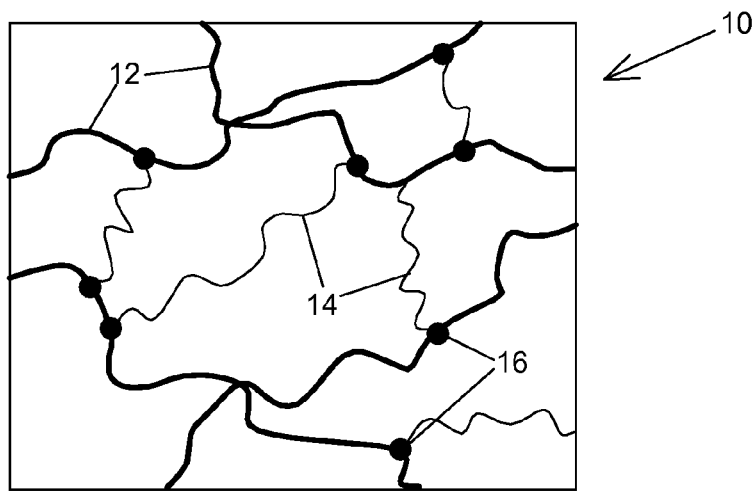
FIG. 1 shows the structure of an inventive AB polymer network obtained by copolymerization of PCLDMA macromonomer and CHMA monomer.

1. Synthesis of poly(ε-caprolactone) dimethacrylate PCL10kDMA 500 g (50 mmol) poly(ε-caprolactone) diol (Aldrich) with an average molecular weight of 10,000 g/mol (PCL10k diol) was placed in 5 L dichloromethane in a dry three-necked flask under a nitrogen atmosphere. While cooling with ice, 20.0 mL (0.14 mol) triethylamine was added by drops. After stirring for 10 minutes at 0° C., 17.4 mL (0.18 mol) methacryloyl chloride was added by drops. The solution was heated to RT and stirred for 24 hours more. The precipitated salt was removed by filtration. The filtrate was concentrated and dissolved in ethyl acetate. This solution was precipitated in a 10-fold excess of a mixture of hexane/diethyl ether/methanol (18:1:1 parts by volume) at −20° C. After vacuum drying, 475 g (47 mmol) poly(ε-caprolactone) dimethacrylate PCLDMA with an average molecular weight of 10 kD (PCL10kDMA) according to formula I c (see above) was obtained (yield 95%). The degree of functionalization of the PCL diols with methacrylate end groups was found to be approx. 85% by $^1$H-NMR spectroscopy. This means that 72% of the macromonomers were functionalized at both ends (dimethacrylate), 26% at one end (monomethacrylate) and 2% were present as the diol without being functionalized.

2. Copolymerization of PCLDMA and CHMA

PCL10kDMA prepared according to Example 1 and cyclohexyl methacrylate (CHMA) (purity≧97%, Aldrich) according to formula II b (see above) was weighed out in different mixing ratios in the range from 10 wt % to 80 wt % PCL10kDMA according to Table 1. These mixtures of PCL10kDMA and CHMA were melted at 70° C. in a flask in an oil bath. After a homogeneous bubble-free melt was obtained, the mixtures were cast on a sheet of glass (10×10 cm) and the shape was closed by applying another sheet of gas with an arrangement of PTFE spacers (thickness 0.55 cm) at the sides. The structure secured by clamps was exposed to UV light for 60 minutes (Fe-doped mercury vapor lamp) to initiate the polymerization/crosslinking. Pure PCL10kDMA was treated accordingly as the comparative material to yield a homopolymer network of PCL10kDMA (PCL(100) in Table 1).

TABLE 1

| Polymer* | PCL10kDMA (g) | CHMA (g) |
|---|---|---|
| PCL(10)CHMA | 0.77 | 6.80 |
| PCL(20)CHMA | 1.40 | 5.60 |
| PCL(25)CHMA | 1.75 | 5.25 |
| PCL(30)CHMA | 2.10 | 4.90 |
| PCL(35)CHMA | 2.45 | 4.56 |
| PCL(40)CHMA | 2.80 | 4.20 |

TABLE 1-continued

| Polymer* | PCL10kDMA (g) | CHMA (g) |
|---|---|---|
| PCL(45)CHMA | 3.06 | 3.70 |
| PCL(50)CHMA | 3.36 | 3.34 |
| PCL(60)CHMA | 4.20 | 2.81 |
| PCL(80)CHMA | 5.60 | 1.40 |
| PCL(100) | 8.50 | — |

*The numbers given in parentheses denote the amount by weight of PCL10kDMA in the polymer network.

Although the starting amounts of PCL10kDMA and CHMA were not quantitatively incorporated into the network, it was ascertained by $^1$H-HRMAS-NMR spectroscopic investigations that the ratio of the two components used in the polymer network remains approximately the same. Unincorporated constituents were first removed by extraction with chloroform.

FIG. 1 shows schematically the structure of a PCL-PCHMA polymer network, which is labeled as 10 on the whole, obtained in this way. In it, the polycyclohexyl methacrylate segments ((PCHMA) segments) are labeled as 12 and the PCL10kDMA chains are labeled as 14. The PCHMA segments 12 are covalently crosslinked by the PCL10kDMA chains 14 bound at both ends. The linkage points between the ends of the PCHMA segments 12 and the PCL10kDMA segments 14 are labeled as 16.

3. Characterization of the Polymer Networks of PCLDMA and PCHMA

The thermal properties of the polymer networks of PCL10kDMA macromonomers and CHMA monomers of different compositions produced according to Example 2 were investigated after extraction with chloroform with differential scanning calorimetry (DSC) and by dynamic mechanical thermoanalysis (DMTA). DSC measurements were performed on a Netzsch DSC 204 Phoenix device. To do so, 5 mg to 10 mg of the samples was weighed into an aluminum vessel and the measurements were performed under a nitrogen atmosphere in a temperature range from −100 to +150° C., using a cooling rate and a heating rate of 10K·min$^{-1}$ to detect the glass transitions and a rate of 1K·min$^{-1}$ to detect melt transitions and/or crystallization transitions. The results are summarized in Table 2. DMTA measurements were performed on an Eplexor 5N (Gabo) equipped with a 25N force pickup. The static load was 0.50%, the dynamic load was 0.20%, the frequency was 10 Hz and the heating rate 2K·min$^{-1}$ in a temperature range from −100° C. to +170° C. These results are also summarized in Table 2.

TABLE 2

| | DSC | | DMTA | | |
|---|---|---|---|---|---|
| Polymer* | $T_g$ (PCL) (° C.) | $T_m$ (PCL) (° C.) | $T_g$ (PCL) (° C.) | $T_m$ (PCL) (° C.) | $T_g$ (PCHMA) (° C.) |
| PCL(10)CHMA | n.d. | 47.9 ± 0.5 | n.d. | n.d. | n.d. |
| PCL(20)CHMA | n.d. | 50.6 ± 0.5 | n.d. | n.d. | n.d. |
| PCL(25)CHMA | −67.5 ± 1.0 | 47.7 ± 0.5 | n.d. | n.d. | n.d. |
| PCL(30)CHMA | −67.1 ± 1.0 | 47.7 ± 0.5 | −66 ± 1 | 51 ± 1 | 142 ± 1 |
| PCL(35)CHMA | −65.6 ± 1.0 | 48.0 ± 0.5 | −66 ± 1 | 51 ± 1 | 140 ± 1 |
| PCL(40)CHMA | −64.4 ± 1.0 | 50.1 ± 0.5 | −65 ± 1 | 50 ± 1 | 141 ± 1 |
| PCL(45)CHMA | −64.3 ± 1.0 | 50.6 ± 0.5 | −66 ± 1 | 49 ± 1 | 141 ± 1 |
| PCL(50)CHMA | −64.5 ± 1.0 | 51.2 ± 0.5 | −66 ± 1 | 50 ± 1 | n.d. |
| PCL(60)CHMA | −63.7 ± 1.0 | 50.6 ± 0.5 | −65 ± 1 | 46 ± 1 | n.d. |
| PCL(80)CHMA | −61.7 ± 1.0 | 52.1 ± 0.5 | −52 ± 1 | 43 ± 1 | n.d. |
| PCL(100) | −60.8 ± 1.0 | 54.2 ± 0.5 | 53 ± 1 | 46 ± 1 | n.d. |

*The numbers given in parentheses denote the amount by weight of PCL10kDMA in the polymer network.
n.d.—could not be determined.

Figure 2:
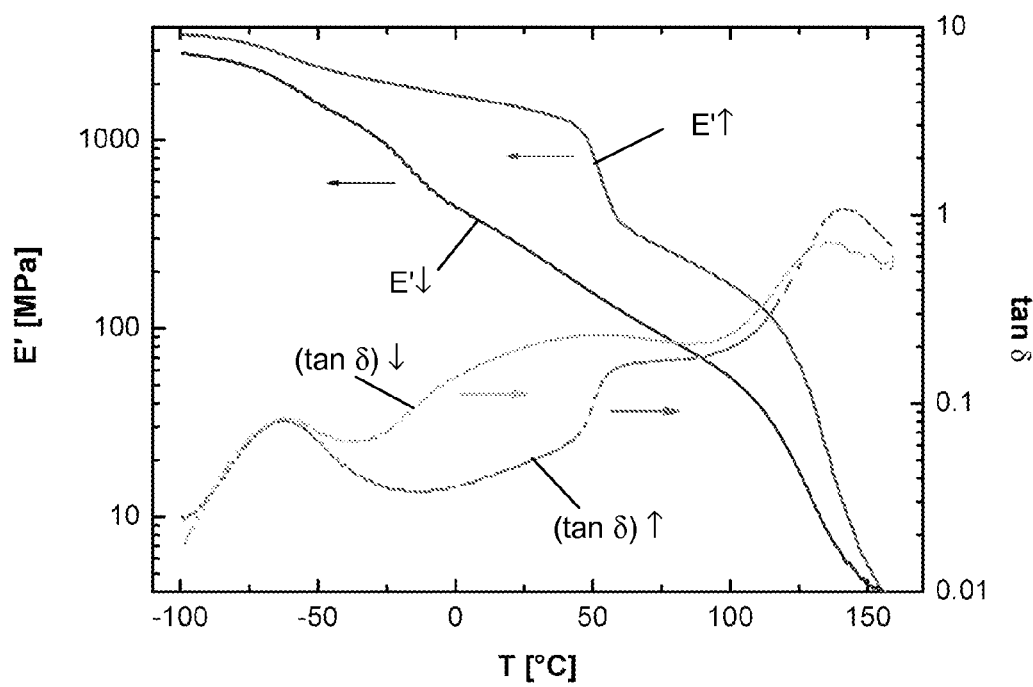
FIG. 2 shows DMTA investigations of the phase transitions of PCL-PCHMA networks.

As in the case of the PCHMA homopolymer (results not shown), no glass transition of the PCHMA segments could be observed in the polymer networks by using DSC measurements, which are relatively insensitive. These were demonstrated by the DMTA analyses. FIG. 2 shows the curves of the storage modulus E' and the mechanical loss factor tan δ measured by DMTA in the heating cycle (↑) and in the cooling cycle (←) for the polymer network PCL(35)CHMA. From these curves, the glass transition temperature of PCL ($T_g$ (PCL)) was determined from the maximum loss modulus E", the melt transition temperature of PCL ($T_m$(PCL)) was determined from the turning point in E', and the glass transition temperature of PCHMA ($T_g$(PCHMA)) was determined from the maximum in tan δ. Above a PCL content of 50% by weight, no glass transition of PCHMA could be detected because of the low signal-to-noise ratio.

It is apparent here that the inventive AB polymer network containing PCL and PCHMA segments has two well-differentiated phase transitions in the range between 0 and 150° C., attributable to the melting of PCL crystals on the one hand and the glass transition of PCHMA domains on the other hand. The lower transition temperature $T_{trans,1}$, is clearly associated with the melting and/or crystallization of PCL segments, which is observed in the homopolymer PCL(100) at 54° C. and is at 48 at [sic] 52° C. in the copolymer networks with a PCL amount by weight between 10% and 80% ($T_m$ (PCL)). However, upper transition temperature $T_{trans,2}$ detected with DMTA at 140-142° C. may be clearly assigned to the glass transition of PCHMA segments ($T_g$(PCHMA)). These results show that the inventive AB polymer network has a phase-separated morphology in which the PCL and PCHMA segments form their own phases with their own transition temperatures, which are suitable for imposing of two temporary shapes in a temperature-controlled process. The existence of amorphous mixed phases may be ruled out because the $T_g$ values for PCL and PCHMA in the polymer network, determined by DMTA, do not differ significantly from those of the corresponding homopolymers.

4. Programming a Polymer Network of PCLDMA and PCHMA

An AB polymer network PCL(45)CHMA based on 45 wt % PCL10kDMA and 55 wt % PCHMA, prepared according to Example 2, was programmed in a cyclic thermomechanical experiment so that in addition to the manufacturing-induced permanent shape, two temporary shapes were also stored in the "shape memory" of a polymer. This occurs in principle by imposing a first temporary shape at a temperature below the glass transition temperature of PCHMA ($T_g$(PCHMA)) or a temperature below the melting point of PCL ($T_m$(PCL)) and subsequently imposing a second temporary shape at a temperature below the melting point of PCL ($T_m$(PCL)).

Figure 3:
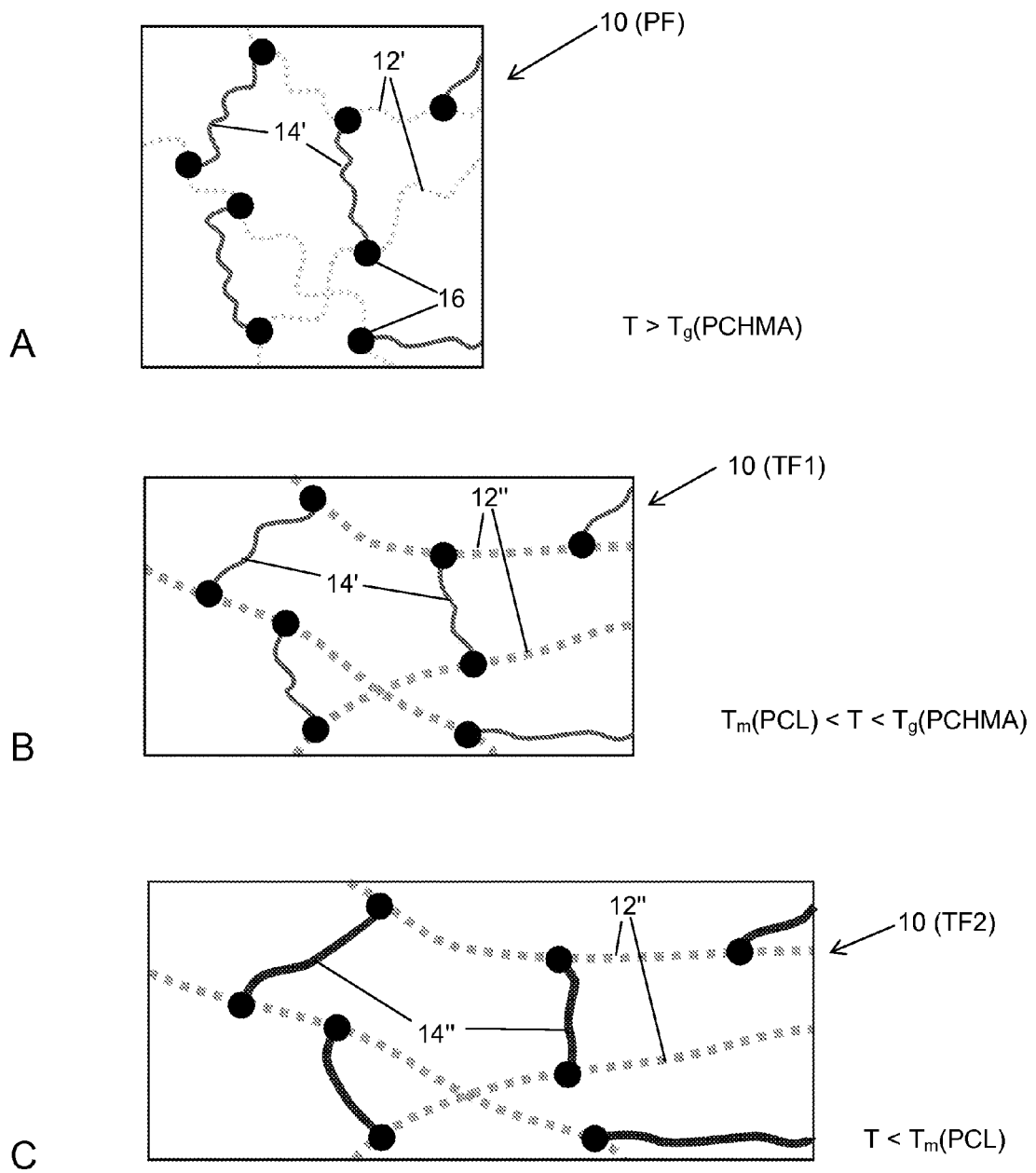
FIG. 3 shows structural changes in an AB polymer network during its programming according to FIG. 1.

This principle is explained on the basis of FIG. 3, where reference numerals similar to those in FIG. 1 are used. FIG. 3A shows the structure of polymer network 10 above the upper transition temperature, i.e., above the glass transition temperature ($T_g$(PCHMA)) of the PCHMA segments. At this temperature, the PCL segments 14 are in an amorphous state, which is characterized by reference numeral 14'. The PCHMA segments 12 are in an elastic amorphous state, which is characterized by 12'. In this initial phase of the programming process, the polymer 10 initially still has its permanent shape PF, which is determined by the manufacturing process, in particular by an external shape predefined during crosslinking.

Starting from the shape illustrated in FIG. 3A, in a first step the polymer network 10 is brought into a shape corresponding to a first temporary shape TF1. This is accomplished by applying a suitable mechanical load above ($T_g$(PCHMA)), which leads to an elongation of polymer 10, for example. This is indicated by horizontal elongation of the polymer detail shown in FIG. 3B. After elongation, the polymer system 10 is cooled to a temperature which is in any case below the glass transition temperature $T_g$(PCHMA), in particular between $T_m$(PCL) and $T_g$(PCHMA). Cooling results in a glass transition in PCHMA segments 12, which are converted from their amorphous elastic state 12' into an amorphous vitreous state 12". The first temporary shape TF1 may optionally be stabilized by heating at $T<T_g$(PCHMA) for a predetermined period of time. The mechanical stress is maintained in the meantime.

In the next step, the second temporary shape TF2 is programmed by analogy with the first temporary shape TF1. The polymer 10 is converted in particular to second temporary shape TF2 by a second mechanical stimulus, which may be accomplished, for example, by further elongation at a temperature above $T_m$(PCL) (indicated by horizontal elongation of the polymer detail in FIG. 3C). The polymer is next cooled to a temperature below the lower transition temperature, i.e., the melting point $T_m$(PCL) of the PCL segments 14, to also impose the second temporary shape TF2. Semicrystalline PCL segments 14" are then formed. While maintaining the mechanical load, the polymer network 10 may also be tempered for a certain period of time in this step, thereby also promoting the formation of PCL crystals.

Starting from a polymer network 10 that is programmed in this way and is present in its second temporary shape TF2, the first temporary shape TP1 [sic; TF1] and the permanent shape PF may be retrieved one after the other when polymer 10 is heated first to an intermediate temperature $T_m(PCL)<T<T_g$ (PCHMA) and then to a temperature above $T_g$(PCHMA). Restoration of previously imposed shapes is referred to as shape memory or shape memory effect (SM effect).

Figure 4:
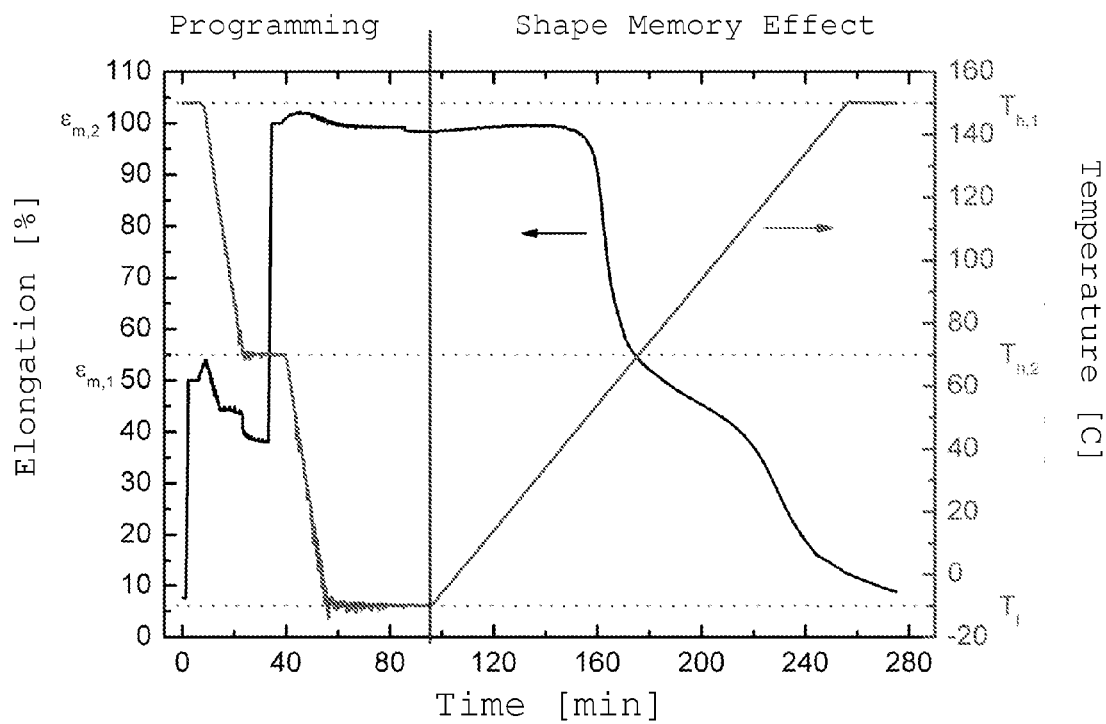
FIG. 4 shows chronological changes in various programming parameters in a cyclical thermomechanical experiment.

FIG. 4 shows the curves of the temperature and of elongation during a programming cycle and restoration cycle of the polymer PCL(35)CHMA.

The programming cycle starts at a temperature $T_{h,1}$ of 150° C. above $T_g$(PCHMA). Then the polymer is elongated to 50% ($\epsilon_{m,1}$) corresponding to the first temporary shape TF1. Next while maintaining the mechanical load, it is cooled to an intermediate temperature of 70° C. ($T_{h,2}$) above $T_g$(PCHMA) and above $T_m$(PCL) with a temperature gradient of 5K·min$^{-1}$, whereupon the sample initially expands somewhat due to its entropy elasticity and then contracts because of its energy elasticity. After a holding time of 30 minutes at 70° C., the polymer relaxes, whereupon a slight reversal in elongation is observed. Next the sample is kept without mechanical load at $T_{h,2}$ for 10 minutes more, then elongated to a 100% total elongation, corresponding to the second temporary shape TF2 ($\epsilon_{m,2}$). Then it is cooled to −10° C. ($T_l$) under a constant mechanical load and the mechanical load is maintained for another 20 minutes to allow crystallization of the PCL domains. The subsequent relaxation of the sample and keeping the temperature at −10° C. for 10 minutes more result in a slight decrease in elongation.

After the end of the programming cycle, the stored shapes are retrieved in succession by heating the sample again from −10° C. to +150° C. (without mechanical load) at a heating rate of 1K·min$^{-1}$. Melting of the PCL crystals and the restoration of the first temporary shape are first observed around $T_m$(PCL). If the temperature is kept at 70° C. for 48 hours, the first temporary shape remains stable and there is no transition to the permanent shape (now shown). Further heating above $T_g$(PCHMA) leads to softening of the vitreous PCHMA domains and to almost quantitative restoration of the permanent shape. This programming and restoration cycle was performed four more times with the same result.

The programming and restoration cycle depicted in FIG. 4 was performed with all AB copolymer networks from Example 2. From the second to fifth cycles, the switching temperatures for the PCL and PCHMA segments were determined and averaged. A switching temperature of 53° C. to 65° C. was found for PCL segments in polymer networks PCL (30)CHMA to PCL(60)CHMA, and a switching temperature of 120° C. to 125° C. was determined for the PCHMA segments.

Figure 5:
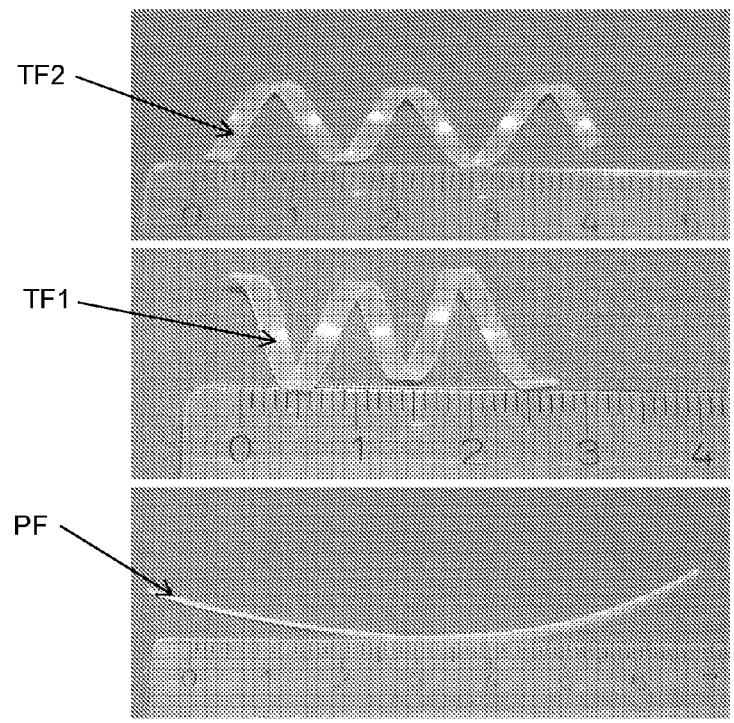
FIG. 5 shows a shape memory polymer according to the invention in an exemplary embodiment.

A demonstration example for practical use of a programmed inventive polymer network PCL(40)CHMA corresponding to Example 2 is shown in FIG. 5. The second temporary shape TF2 of the polymer at room temperature, corresponding to a spiral shape, is shown in the upper part of the figure. With heating of the polymer system to a temperature of 70° C., the spirals contract from initially approx. 4 cm to approx. 2.5 cm, whereupon the spiral diameter increases (FIG. 5, central part). This shape corresponds to the first temporary shape TF1. With further heating of the polymer system to 150° C., the polymer undergoes complete bending with the loss of spiral shape. Instead of that, the polymer system resumes its rod-shaped permanent shape PF (FIG. 5, bottom part).

LIST OF REFERENCE NUMERALS

PF permanent shape
TF1 first temporary shape
TF2 second temporary shape
$T_{trans,1}$ first transition temperature $T_{trans,2}$ second transition temperature
$T_m$(PCL) melt temperature of the PCL segments
$T_g$(PCHMA) glass transition temperature of the PCHMA segments
10 polymer network
12 PCHMA segments
12' amorphous elastic PCHMA segments
12" amorphous vitreous PCHMA segments
14 PCL segments
14' amorphous PCL chains
14" semicrystalline PCL chains
16 linkage points

What is claimed is:

1. A shape memory polymer comprising at least two switching segments, in which the shape memory polymer is an AB polymer network in which one of the switching segments is crosslinked by the other switching segment, which is bound terminally at both ends, and in which a first switching segment is based essentially on a polyester of the general formula I, where n=1, . . . , 6, or a copolyester of general formula I with different values of n, or a derivative of these, and a second switching segment is based essentially on a polyacrylate of general formula II, in which R denotes H or $CH_3$ and $R_1$ denotes cyclohexyl $C_6H_{11}$ or in which R denotes $CH_3$ and $R_1$ denotes $CH_3$ or in which R denotes $CH_3$ and $R_1$ denotes 2-hydroxyethyl $C_2H_4OH$, and in which p and q are selected so that the first and second switching segments in the shape memory polymer each form a segregated phase with each phase having at least one transition temperature independently selected from a glass transition temperature and a melt temperature so that the polymer can assume at least two temporary shapes (TF1, TF2) in addition to one permanent shape, depending on the temperature:

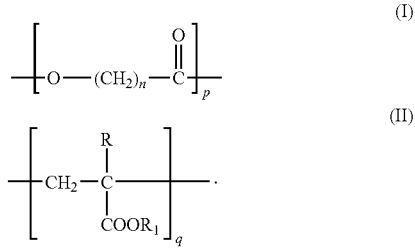

2. The shape memory polymer according to claim 1, wherein the first switching segment comprises a poly(ε-caprolactone) segment with n=5 or a derivative thereof, in which the aliphatic carbons, independently of one another, may be substituted with one or two branched or unbranched, saturated or unsaturated $C_1$ to $C_6$ radicals.

3. The shape memory polymer according to claim 1, wherein the first switching segment has a number average molecular weight $M_n$ in the range of 2000 g/mol to 100,000 g/mol.

4. The shape memory polymer according to claim 1, wherein an amount by weight of the polyester segment in the shape memory polymer is in the range of 25% to 75%.

5. The shape memory polymer according to claim 1, wherein the shape memory polymer is an AB polymer network in which polyacrylate segments are crosslinked with polyester chains bound terminally at both ends.

6. A method for producing a shape memory polymer according to claim 1, wherein a polyester macromonomer of general formula I a, in which n=1, . . . , 6 and Y is a connecting radical, or a copolyester macromonomer of general formula I a, with different values of n or a derivative thereof, wherein $R_2$ or the second end group $R_3$, independently of one another, denotes a polymerizable end group, and an acrylate monomer of general formula II a, in which R is H or $CH_3$ and $R_1$ denotes cyclohexyl $C_6H_{11}$ or in which R denotes $CH_3$ and $R_1$ denotes $CH_3$ or in which R denotes $CH_3$ and $R_1$ denotes 2-hydroxyethyl $C_2H_4OH$, are copolymerized

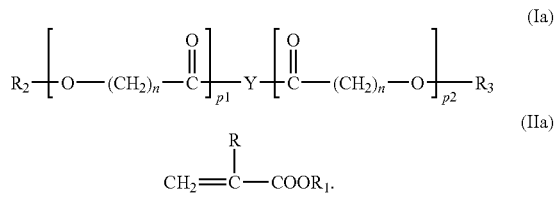

7. The method according to claim 6, wherein $R_2$ and $R_3$ each denote a polymerizable end group.

8. The method according to claim 6, wherein the first end group $R_2$ and/or the second end group $R_3$ of the polyester component is/are an acryl radical or a methacryl radical.

9. The shape memory polymer according to claim 3, wherein the first switching segment has a number average molecular weight $M_n$ in the range of 5,000 g/mol to 40,000 g/mol.

10. The shape memory polymer according to claim 3, wherein the first switching segment has a number average molecular weight $M_n$ of 10,000 g/mol.

11. The shape memory polymer according to claim 4, wherein an amount by weight of the polyester segment in the shape memory polymer is in the range of 30% to 70%.

12. The shape memory polymer according to claim 4, wherein an amount by weight of the polyester segment in the shape memory polymer is in the range of 50% to 60%.

* * * * *